United States Patent [19]

Linnemann

[11] Patent Number: 5,691,483
[45] Date of Patent: Nov. 25, 1997

[54] METHOD AND APPARATUS FOR DETERMINING A REAL VELOCITY DISTRIBUTION OF SOLID PARTICLES TRAVELLING IN A GAS CARRIER FLOW FOR SHOT PEENING

[75] Inventor: Wolfgang Linnemann, Aachen, Germany

[73] Assignee: Kugelstrahlzentrum Aachen GmbH, Herzogenrath, Germany

[21] Appl. No.: 420,062

[22] Filed: Apr. 11, 1995

[30] Foreign Application Priority Data

Apr. 12, 1994 [DE] Germany ............... 44 12 494.5

[51] Int. Cl.$^6$ .................................... G01F 1/76
[52] U.S. Cl. .......................... 73/861.05; 72/53
[58] Field of Search .............. 73/861.05, 861.41, 73/861.11; 72/53

[56] References Cited

U.S. PATENT DOCUMENTS

| | | | |
|---|---|---|---|
| 4,873,855 | 10/1989 | Thompson | 72/53 |
| 5,064,603 | 11/1991 | Hurwitz et al. | 73/861.05 |
| 5,176,018 | 1/1993 | Thompson | 72/53 |
| 5,186,057 | 2/1993 | Everhart | 73/861.41 |

FOREIGN PATENT DOCUMENTS 2126859 12/1971 Germany.

OTHER PUBLICATIONS

Translation "Techniques", H9 (1992), pp. 917–921.

*Primary Examiner*—Richard Chilcot
*Assistant Examiner*—Harshad Patel
*Attorney, Agent, or Firm*—W. G. Fasse; W. F. Fasse

[57] ABSTRACT

The velocity distribution of a solid particle travelling in a carrier flow, such as a flow of peening shot or balls, is measured by first passing the solid particles or balls forming the shot through light barriers to generate respective pulse trains. The light barriers have a defined spacing from each other and the time between the light signals is measured for calculating the velocity. Such calculation is possible based on the time difference between one first signal generated by the first light barrier and a plurality of signals generated at the second light barrier and based on the fixed spacing between the light barriers. The measurements are repeated for a sufficient number of times to obtain statistically valid numbers of measurements. A sum velocity distribution is calculated from these measurements. A known randomly ascertained velocity distribution also referred to as background distribution, is substrated from the sum velocity distribution, whereby the difference yields the real velocity distribution of the particles. The resulting control signal is used to control the supply of shot and the carrier flow.

10 Claims, 16 Drawing Sheets

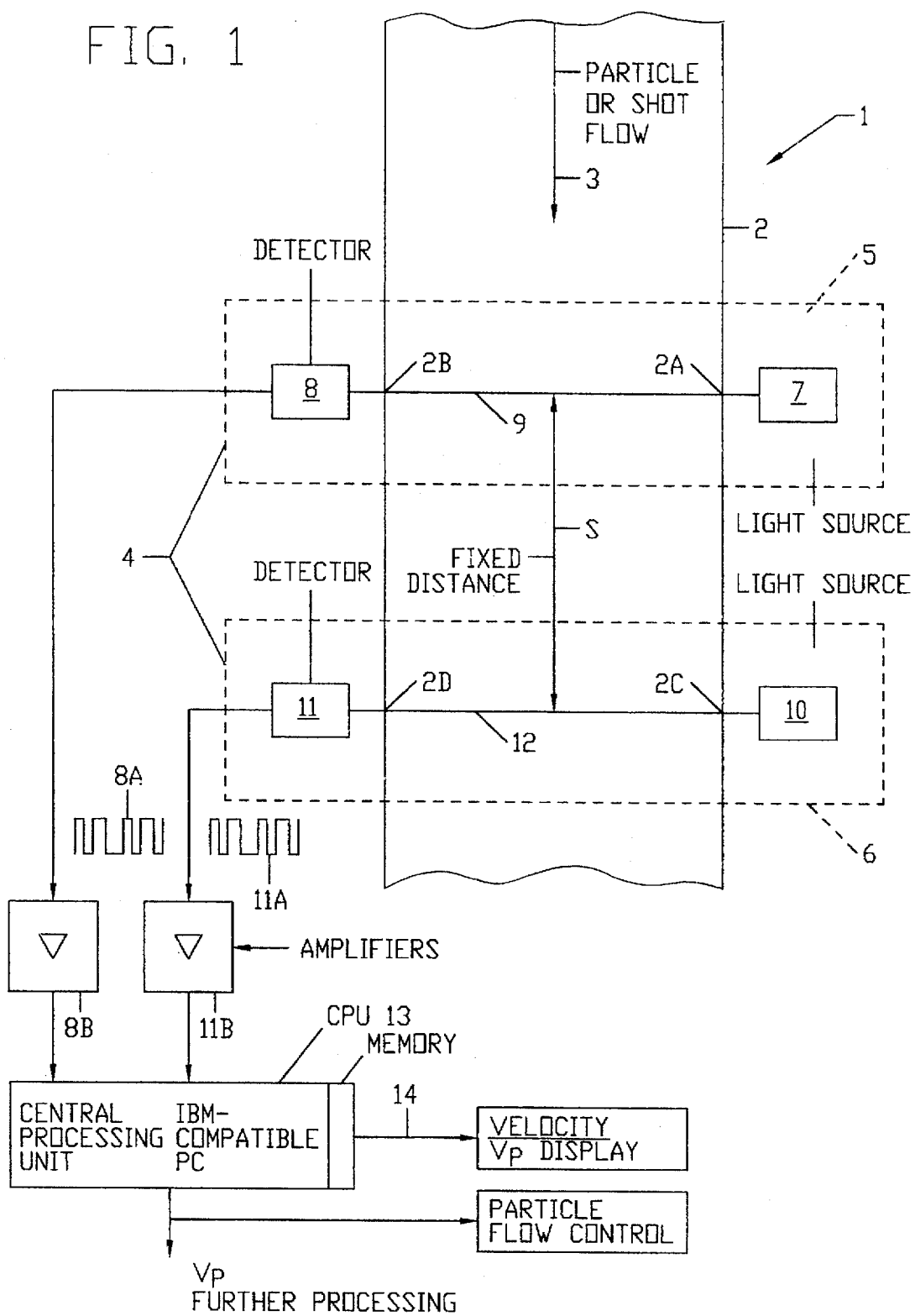

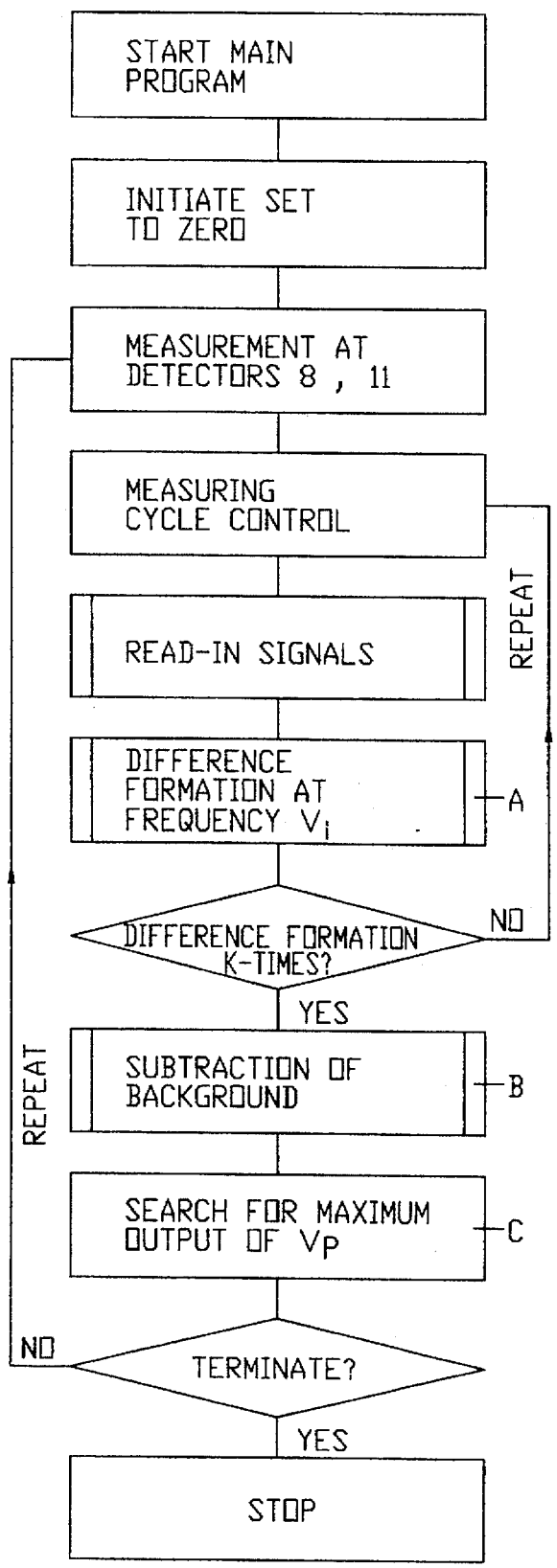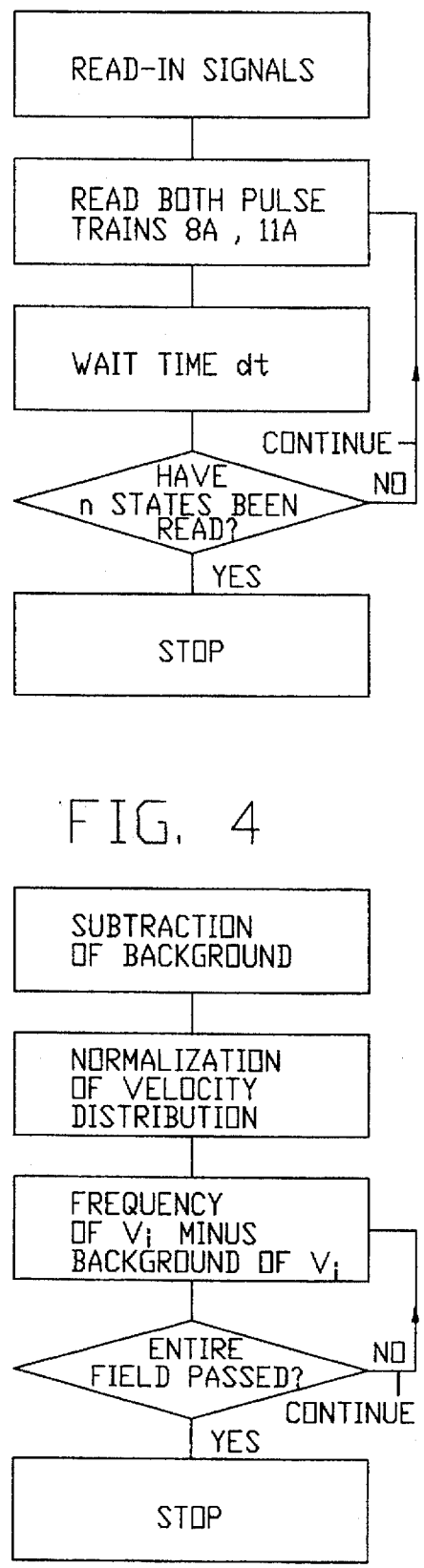

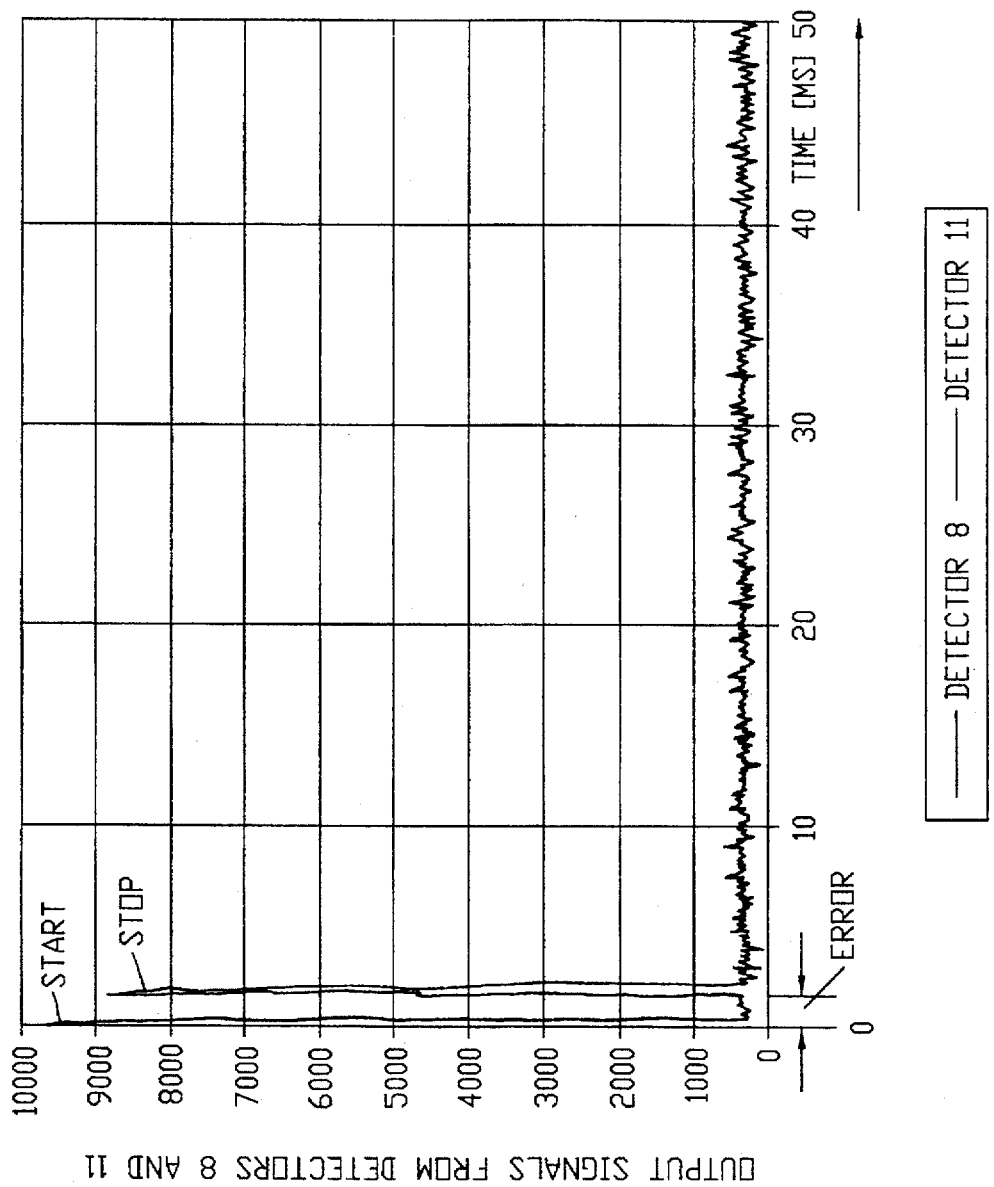

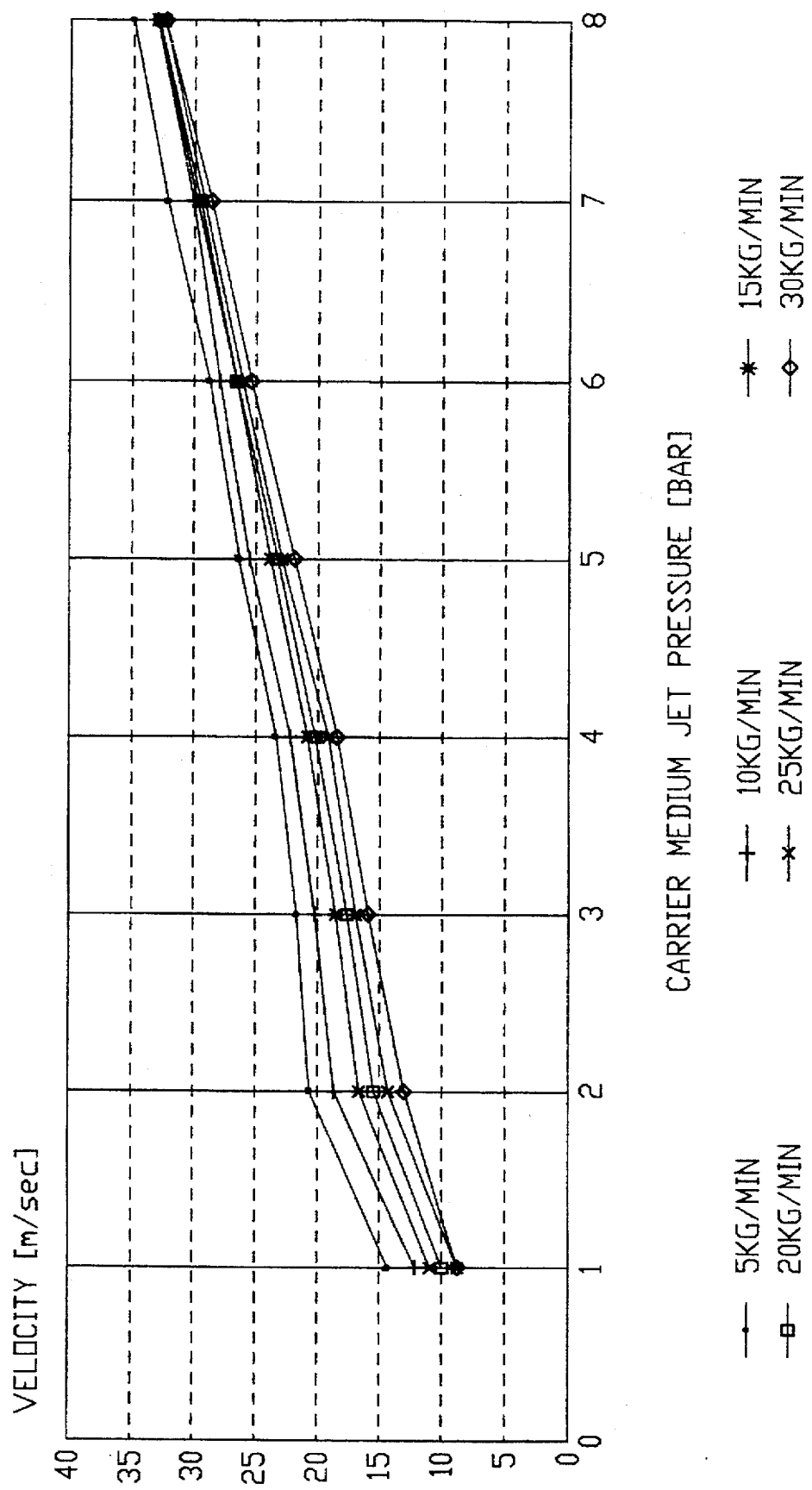

5,691,483

METHOD AND APPARATUS FOR DETERMINING A REAL VELOCITY DISTRIBUTION OF SOLID PARTICLES TRAVELLING IN A GAS CARRIER FLOW FOR SHOT PEENING

FIELD OF THE INVENTION

The invention relates to a method and apparatus for determining the real velocity distribution of solid particles travelling in a gas carrier flow. The solid particles are, for example, so-called shot used in shot-peening operations in which the particles or "shot" travel in a carrier jet stream of a gas, such as air.

BACKGROUND INFORMATION

The individual solid particles, such as shot in a shot-peening operation travel substantially independently of one another and substantially in the same direction through a confined flow passage. According to a known method, a small measuring volume is irradiated with a light beam so that at least a partial flow of the solid particles is exposed to light beams which generate a light signal sequence or pulse train. If one solid particle in the flow or jet passes through this small measuring volume, the light is deflected onto two slots, each having a different slot width. The two slots are spaced from each other by a defined or fixed spacing. The signal sequence generated by one of the two slots is received by a respective optical detector. This signal sequence will exhibit a defined light-dark-light-dark ratio only if the light signal sequence is generated by a single solid particle. In this instance the light signal sequence received by the optical detector is inversely proportional to the velocity of the solid particle travelling in the carrier jet. A substantial disadvantage of the just described known measuring methods results from the relatively involved analysis of the characteristics of the signals generated.

U.S. Pat. No. 4,873,855 discloses a method that is suitable only for ferro-magnetic shot, for measuring the velocity of the shot jets, whereby a magnetic measuring coil is used. The magnetic coil is installed below an acceleration device constructed as an acceleration nozzle. The inductivity of this measuring coil depends on the density of the shot distribution in the measuring volume. The shot distribution inside the measuring volume is inversely proportional to the shot velocity in the measuring volume for a given shot flow. The measuring of the coil inductivity and the simultaneous measuring of the shot flow permits making a conclusion on the velocity of the solid particles, such as shot.

Shot-peening is well suited for strengthening and deforming of structural components. For this purpose, the shot particles are accelerated and shot onto the surface of the structural component, whereby a thin surface layer of the structural component impacted upon by the shot jet or solid particle flow is plastified and stretched. As a result of this procedure residual stresses are induced into the cross-section of the structural component. These residual stresses have a positive effect on the material characteristics of the structural component. When molding or shaping is performed by peening, the intensity of the solid particle or shot flow is selected to be so large that additionally a macroscopic, one-dimensional or two-dimensional bending of the structural component is caused.

For a given shot particle size the velocity of the shot or particle flow has a substantial influence on the deforming result in all mechanical peening operations. Thus, there is a large interest in obtaining a velocity measuring method and determining or ascertaining the velocity of the solid particles or shot.

OBJECTS OF THE INVENTION

In view of the above it is the aim of the invention to achieve the following objects singly or in combination:

to provide a measuring or determining method which can be applied for all types of solid particles or shots travelling in or with a carrier gas flow, and which method permits a simple analysis of the signals generated for the velocity determination;

to solve the problem of correlating signals generated by a multitude of solid particles or shot passing two signal generating stations;

to provide a statistical interpretation of the measured pulse train for deriving the desired real velocity of the shot; and to provide a simple, yet effective apparatus for the measuring of the pulse train signals and for their interpretation.

SUMMARY OF THE INVENTION

The particles or shot, the velocity of which is to be measured, are passed in a gas carrier flow through two measuring stations along a traveling path, whereby the stations have a fixed distance from each other. At least a partial flow or stream of the particles is exposed to light, particularly light beams at each of these stations to generate a light signal sequence or pulse train at each station. Each signal generating station is provided with the light sources and a respective detector for detecting reflected or transmitted or interrupted light at the respective measuring station as a function of time. The signal or pulse trains generated at each measuring station are then stored in a memory. Based on the time difference between one signal of the first series of pulses in a train and a multitude of signals generated at the second measuring station, and further based on the fixed distance "s" between the measuring stations, velocities are repeatedly calculated from the stored signals. These calculated velocities provide a sum velocity distribution of the solid particles. A background velocity distribution is produced statistically on a random basis. The background velocity distribution is deducted from the sum velocity distribution to thereby obtain the real velocity distribution of the particles travelling through the defined path between the two measuring stations.

According to the method of the invention the particle velocity distribution is determined by measuring the time that a solid particle requires for passing a distance of defined length s or ds. For this purpose, two light beams are directed onto the particle flow or stream at points having the defined distance from each other. The light beams form a light barrier that is either transmitted or reflected to an optical detector that produces electrical impulses as a function of time in response to the particles passing through the beams. If small solid particle streams pass through the testing or measuring distance in the flow passage, it can be assumed that normally only individual solid particles are currently present within the testing section of the flow passage. The testing section of the flow passage is defined as that part of the flow passage that has a defined length s between two light beams. If these particles pass through the first light beam a characteristic signal is generated and sensed or registered by the first optical detector. A respective characteristic signal is generated by the second light source at the second measuring location when the particle passes through the second light beam after a certain time interval dt.

BRIEF DESCRIPTION OF THE DRAWINGS

In order that the invention may be clearly understood, it will now be described, by way of example, with reference to the accompanying drawings, wherein:

FIG. 1 is a schematic blow diagram of an apparatus according to the invention for ascertaining the real velocity of solid particles propelled by a carrier gas stream or jet;

FIG. 2 is a flow diagram of the main program sequence performed by a central processing unit computer in FIG. 1;

FIG. 3 is a flow diagram of a detail to ascertain whether a required number of signals have been detected in the main program;

FIG. 4 is a flow diagram of a further detail for calculating the real particle velocity distribution as part of the main program;

FIG. 21 is a view similar to that of FIG. 6, however relating to an error correction; and FIG. 22 shows the particle velocity as a function of the jet or beam pressure of the carrier medium with several different mass flow parameters of the solid particles in kg/min.

Figure 5:
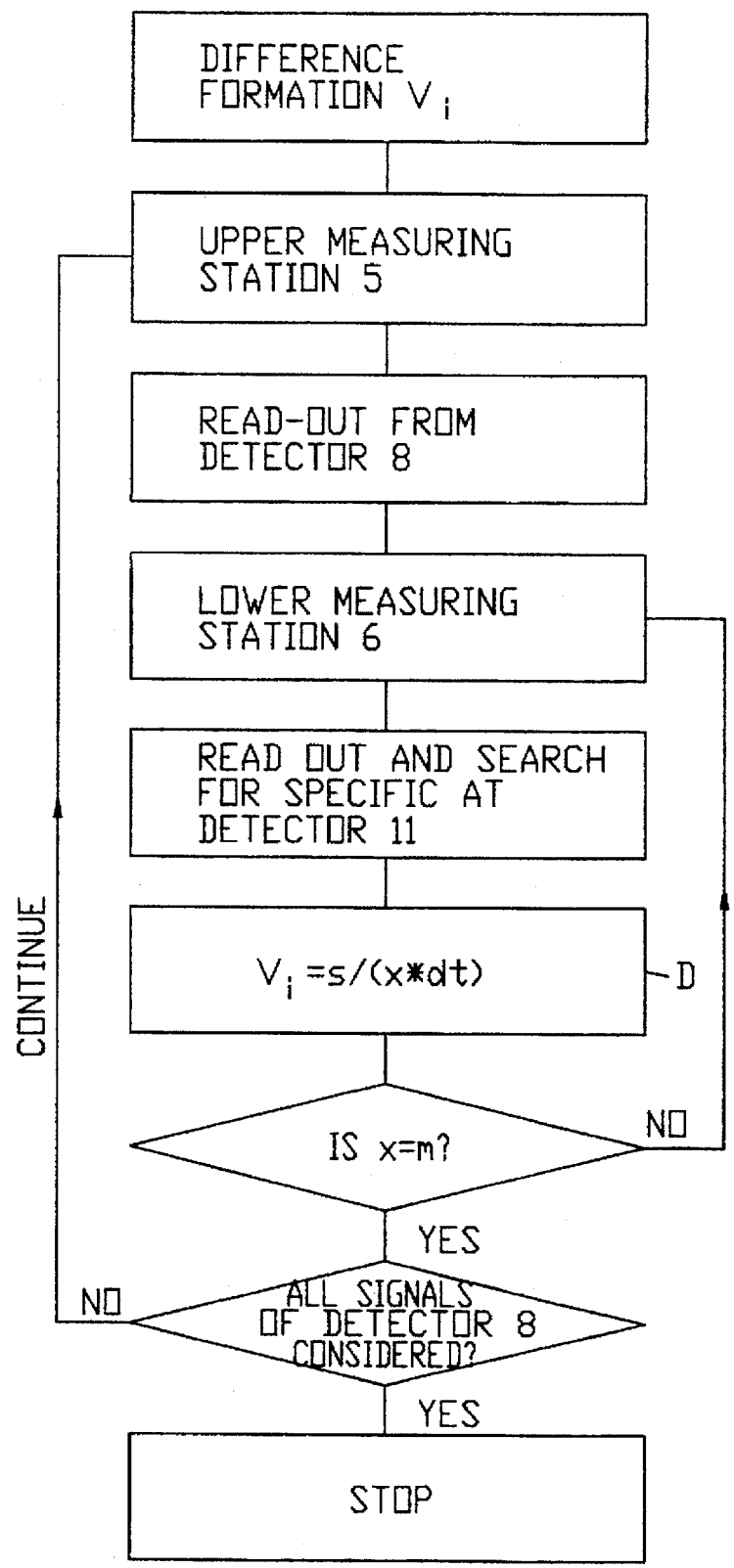
FIG. 5 is a flow diagram of more detailed steps in the difference formation shown by a single block in FIG. 2.

DETAILED DESCRIPTION OF PREFERRED EXAMPLE EMBODIMENTS AND OF THE BEST MODE OF THE INVENTION

FIG. 1 shows an apparatus 1 according to the invention suitable for performing the present method. A flow passage 2 in the form of a channel or duct is arranged vertically to pass a particle stream or shot jet 3 through a testing section 4 in the duct 2. The testing section 4 comprises an upper measuring station 5 and a lower measuring station 6. The upper measuring station 5 comprises a first light source 7 positioned to cooperate with a first optical detector 8. For this purpose the light source 7 passes a light beam 9 through light transparent openings 2A and 2B in the flow passage 2 toward the detector 8. The second measuring station 6 comprises a second light source 10 positioned to cooperate with a second light detector 11. For this purpose the light source 10 emits a second light beam 12 that enters into the flow passage at a transparent entrance 2C and exits at a transparent exit 2D to be received by the optical sensor 11. The spacing or distance ds in the flow direction is precisely defined by the two light beams 9 and 12.

The first light detector 8 generates a first pulse train 8A in response to solid particles, for example interrupting or reflecting the light beam 9. The second light detector 11 generates a pulse train 11A, whereby an impulse in the second pulse train 11A occurs with a defined time delay following a corresponding starting impulse generated by the light beam 9 when interrupted by a solid particle. Based on this time delay and the given distance S the invention calculates the actual velocity of the particles as will be explained in more detail below. The pulse train 8A passes through an amplifier 8B and then into a central processing unit 13. The pulse train 11A passes through an amplifier 11B to the central processing unit 13 which operates in accordance with the flow diagram shown in FIGS. 2, 3, 4 and 5. The central processing unit 13 has one output 14 connected to a display 15 for displaying the actual particle velocity $V_p$. The unit 13 also has an output 16 providing actual velocity representing signals for further processing, for example, for controlling the particle flow 3 by providing respective control signals, for example to a blower and/or a particle supply source that feeds the particles into an airstream generated by the blower. The blower and the particle supply source are not shown, since they are conventional.

FIG. 2 shows the main program sequence to be performed by the central processing unit CPU 13 shown in FIG. 1. After starting, all fields, variables, and data structures are initiated, namely set to zero. The boxes in the flow diagram are referred to as "fields". The program has an internal loop which causes a repetition after checking whether the difference formation in field A has ben performed k-times. The factor k is determined by experiment for each particular peening application. FIG. 3 shows that both detectors 8 and 11 are being read-out n-times at a time spacing of dt. n-read-out signals are stored in a memory of the CPU13. Then, starting with one signal from the first or upper detector 8, signals from the second or lower detector 11 are sought out and in accordance with the different time positions of these signals, expressed in the difference x of the indices of the two entries, a velocity $v_i$ is calculated from the two signals: $v_i = s/(x*dt)$, see FIG. 5, field D.

The search stops when the difference in the indices exceeds m. The size of m depends on the minimum velocity to be determined.

A velocity frequency distribution in accordance with the calculated number of $v_i$ is stored in a further field having a memory capacity for m entries. The current velocity $v_i$ is assumed to provide an index for the further field.

The foregoing is performed for each signal detected by the upper or first detector 8.

After the frequency distribution has been determined it is normalized. Thereafter, a background velocity distribution is subtracted in field B. The background velocity distribution is calculated statistically by considering the probability, that a peening ball or a single shot has a velocity within a certain velocity range or velocity interval.

Following the subtraction of the background velocity distribution, the maximum frequency is sought out in field C for the actual particle velocity $v_p$ which is then outputted at 16 or displayed at 15 in FIG. 1. A new measuring cycle will begin if no termination of the velocity measurement was indicated.

Figure 6:
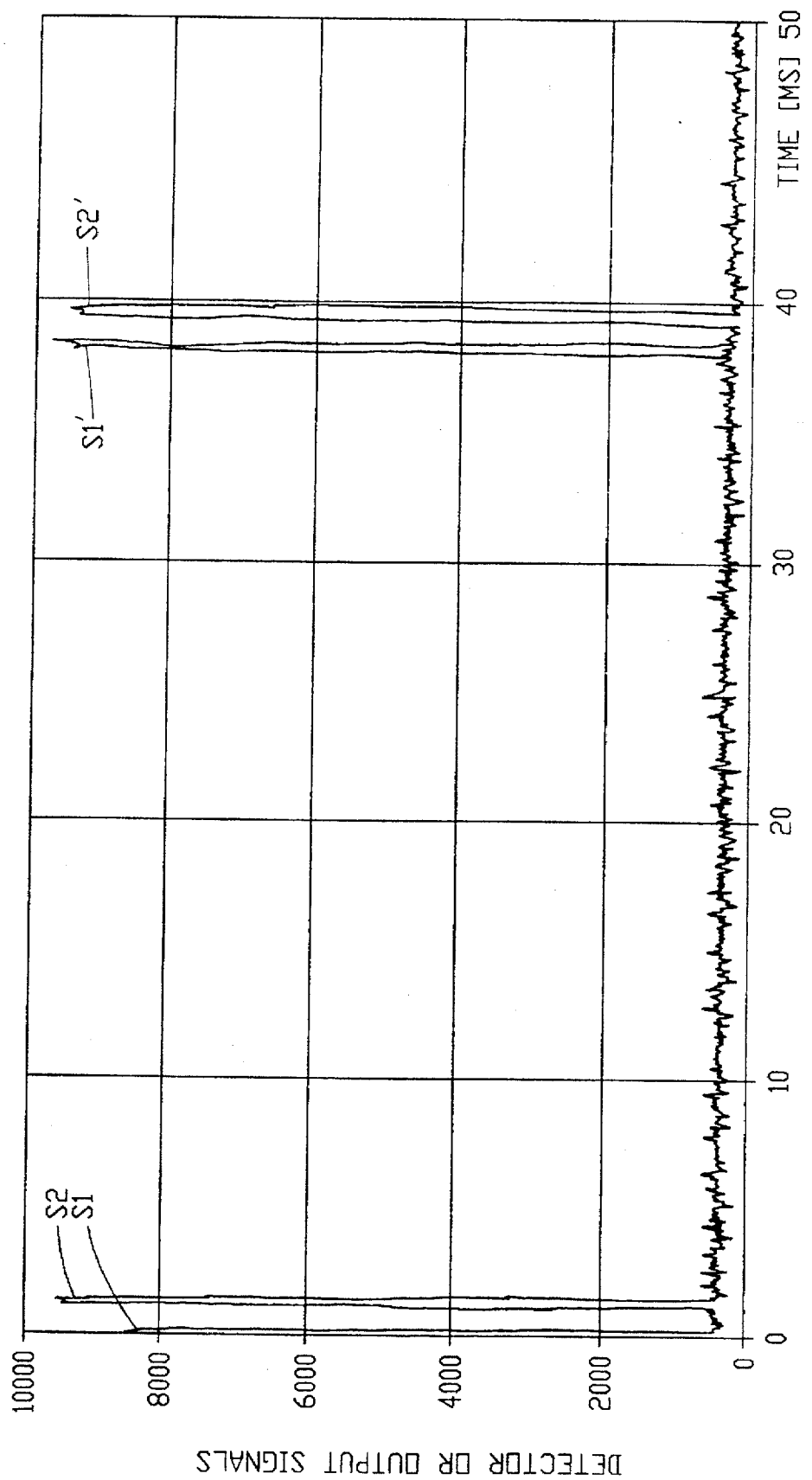
FIG. 6 shows two signals generated as a function of time by a single solid particle passing sequentially through light beams crossing the flow passage of FIG. 1.

FIG. 6 shows two starting impulses S1 and S2 generated by the light beam 9 in the first measuring station 5 by different solid particles passing through the first measuring station. FIG. 6 also shows the respective signals S1' and S2' generated by the light beam 12 in the second measuring station by two different solid particles. The time delay dt between S1 and S1' is measured. Similarly, the time delay between S2 and S2' is measured, whereby it is possible, based on the known distance ds to calculate the velocity v $$v = ds/dt \qquad \text{Equation (1)}$$

Figure 7:
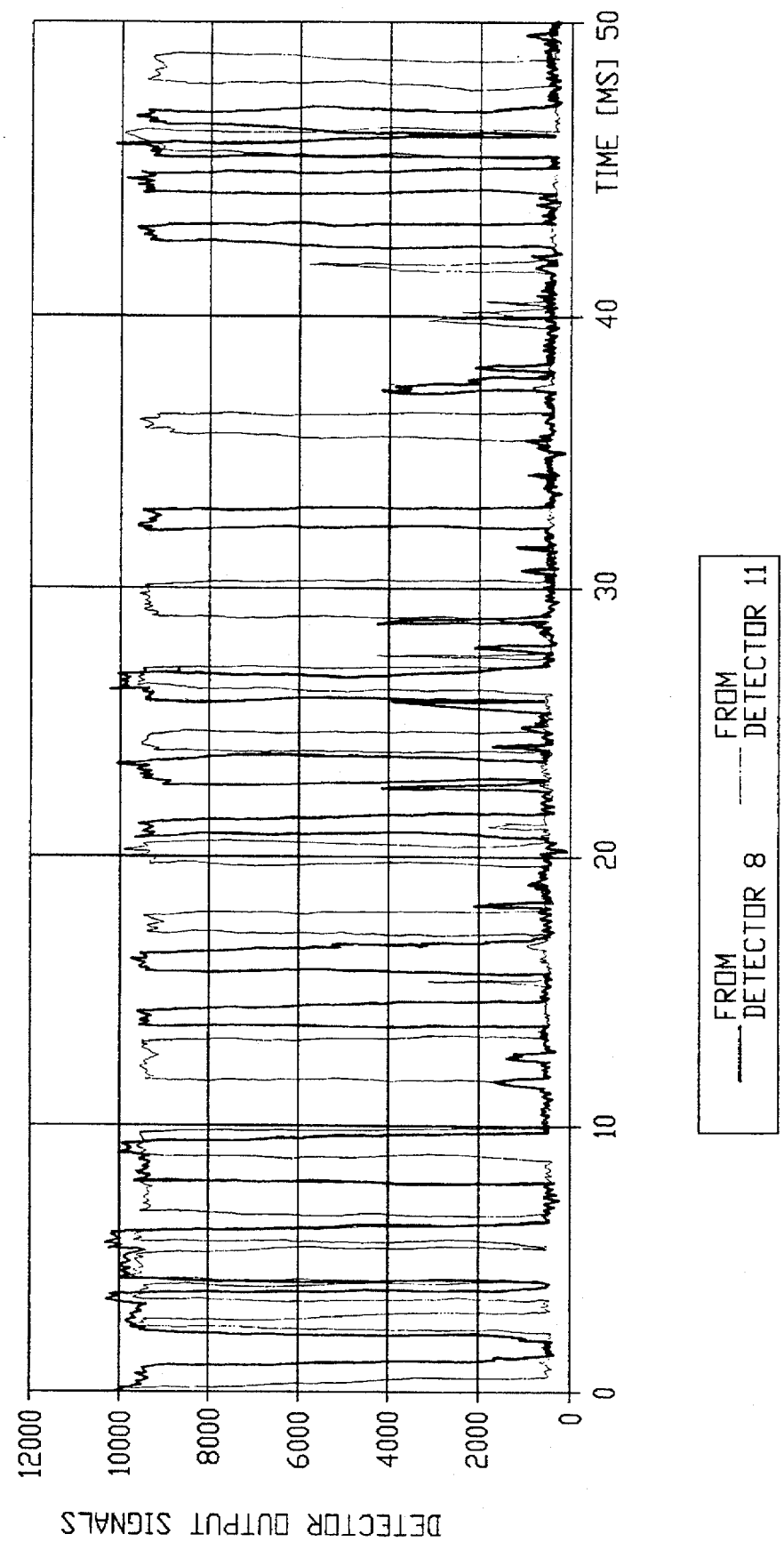
FIG. 7 shows a signal pattern generated as a function of time by a multitude of solid particles or shot passing through the flow passage of FIG. 1.

The foregoing applies when a distinction between individual solid particles can be clearly made, in other words, when it is clear which pair of start and stop pulses was generated by the same solid particle. However, in reality a measuring procedure needs to take into account that at a certain point of time a large number of particles will be passing substantially randomly through the distance between the two measuring stations 5 and 6. As a result, between the first and second light beams a plurality or multitude of impulses will be registered within the measuring time dt as shown in FIG. 7, wherein the heavier line shows impulses from the first light barrier 9 detected by the first light detector 8 in the first measuring station 5 while thin line impulses represent signals detected by the second light detector 11 in the second measuring station 6. A definite correlation of start and stop impulses generated by the same solid particle is no longer possible. The invention provides a solution to this problem with the aid of a statistical interpretation which permits determining or deriving the real velocity of the particle on the basis of the measured impulse trains. Such interpretation requires making the following assumptions:

First, the number N of particles that are registered within one measuring interval ΔT is always much larger than 1.

Second, the motions of the individual particles are always independent of one another.

These conditions or assumptions are always satisfied by shot-peening particle flows.

Figure 8:
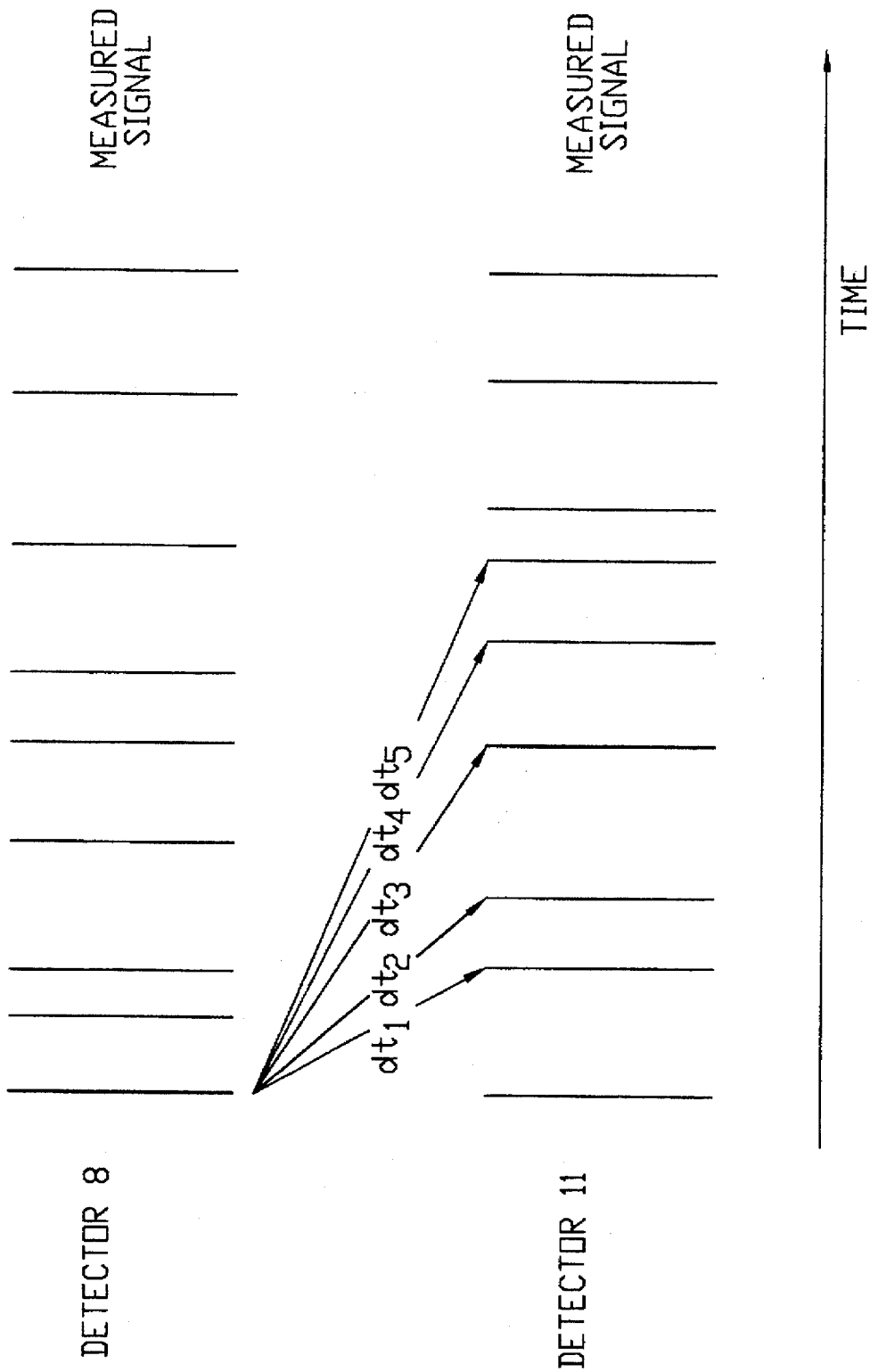
FIG. 8 illustrates an assumption that substantially all signals measured at the second light source have been generated by the particle that generated the start signal at the first light sensor.

If the passage of a particle through the first light beam 9 is used as the start signal for the measuring at the second light beam 12, one could assume that each pulse generated by the second light beam has been caused by the particle that generated the starting signal for the measuring. This assumption is illustrated in FIG. 8. In reality, however, there is only one pair of impulses that has been generated by the same particle as shown by the two heavy vertical lines in FIG. 8. For an on-line measurement of the particle velocity a velocity $v_i$ is first allocated to each time interval $dt_i$ $$v_i = ds/dt_i \qquad \text{Equation (2)}$$

Only the time difference between the heavy vertical lines that represent impulses generated by the same particle, provides the correct velocity of that particle. With the given measured signals it is thus not yet possible at this point of time to determine which of the calculated velocities is the real or actual velocity of a specific particle. However, if the measurements are repeated k-times the present method assures that the correct particle velocity V is also registered k-times while the random velocities are distributed over the entire velocity range. These random velocities are referred to herein as "background velocities" and are determined by the following equation:

$$\frac{ds}{\Delta T} = v_{min} \leq v_i \leq v_{max} = \frac{ds}{dt} \qquad \text{Equation (3)}$$

wherein ΔT is the time duration of one measuring interval during which N number of particles pass through the measuring distance ds, and wherein dt is the smallest measuring time interval.

Figure 9:
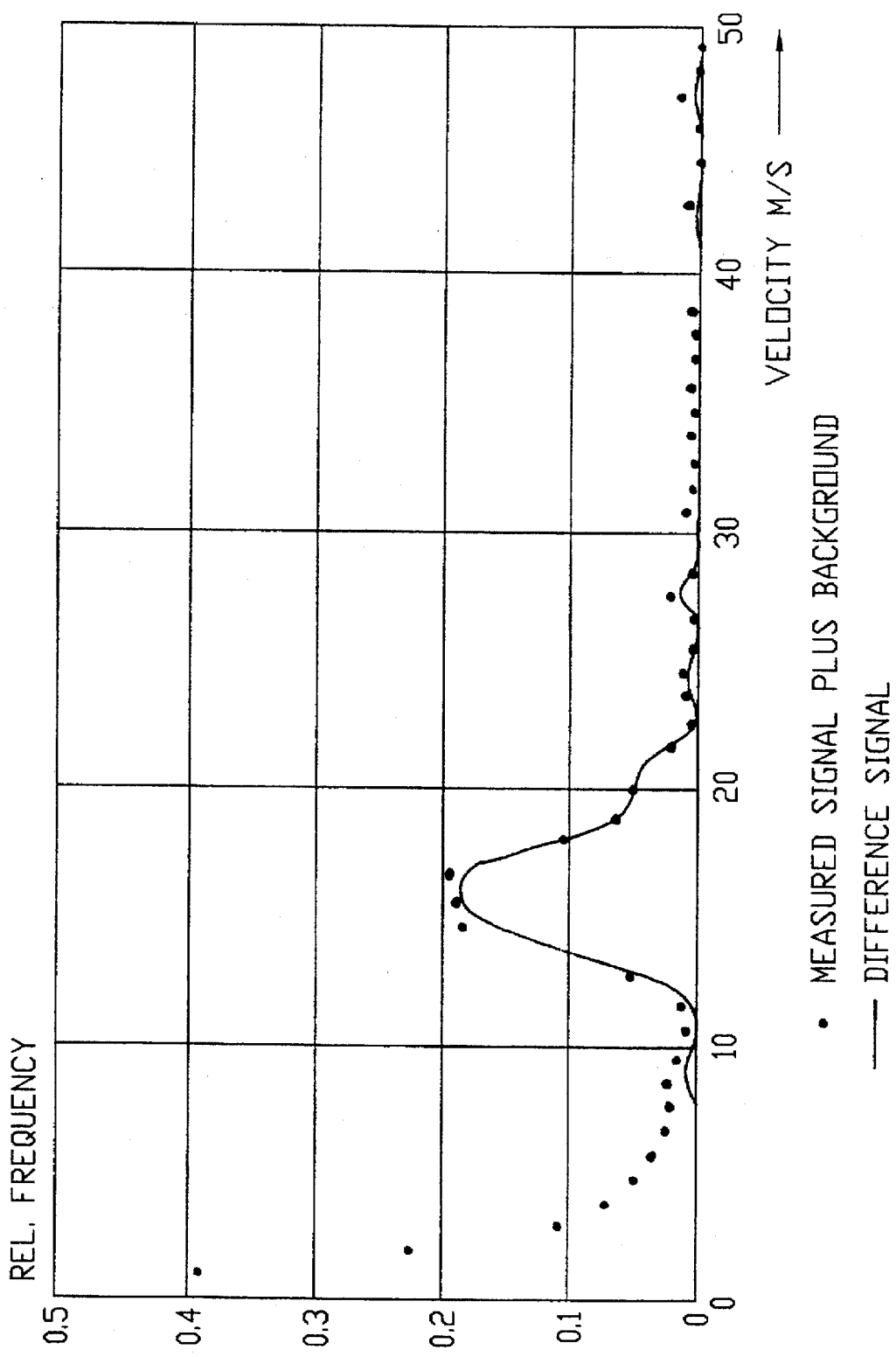
FIG. 9 shows the relative frequency of occurrence as a function of the particle velocity with a bell-curve type frequency density.

FIG. 9 shows the relative frequency of the particle flow velocity v as a function of velocity in meter per second, whereby the present method yields a frequency density at the tip of a bell-type distribution curve.

For the final determination of the solid particle flow real velocity it is necessary to subtract from the total or sum distribution the above mentioned background velocity distribution because the sum distribution comprises the real velocity distribution plus the background velocity distribution. After such subtraction one obtains the resulting differential distribution which yields the real or actual velocity distribution of the solid particles travelling through the testing section of the flow passage. Thus: total velocity distribution–background velocity distribution=real particle velocity.

For calculating the background velocity distribution, the following calculations and assumptions are made. The measuring begins at the time $t=t_0$ and the measuring duration ΔT is as defined above. During this time duration N particles move independently of each other through the testing section thereby passing through the first and second light beams 9 and 12. For this purpose, a signal is to be registered for the probable density within the time interval t+dt in accordance with the following equation:

$$\frac{dp(t)}{dt} = \frac{1}{N} \frac{N}{\Delta T} = \text{constant} \qquad \text{Equation (4)}$$

The respective signal can be derived directly by substitution of $$v = s/t \qquad \text{Equation (5)}$$

to obtain the probability density in the interval v+dv from the following equation $$\frac{dp(v)}{dv} = -\frac{s}{\Delta T} \frac{1}{v^2} \qquad \text{Equation (6)}$$

The substitution value v corresponds to the velocity of one particle that passes at the time $t_0=0$ the first light beam 9 and travels through the distance ds. This particle is then registered at the time $t_1$ at the second light beam 12.

By integrating the probability density within the limits $v_1$ and $v_2$ one obtains the probability p to the effect that one solid particle has a velocity within the velocity interval $v_1$, $v_2$ as follows:

$$p(v_1, v_2) = -\int_{v_1}^{v_2} dv \frac{s}{\Delta T} \frac{1}{v^2} = \frac{s}{\Delta T} \left( \frac{1}{v_1} - \frac{1}{v_2} \right) \qquad \text{Equation (7)}$$

wherein $$\frac{s}{\Delta T} \leq v_1 < v_2 \leq \frac{s}{dt} \qquad \text{Equation (8)}$$

Figure 10:
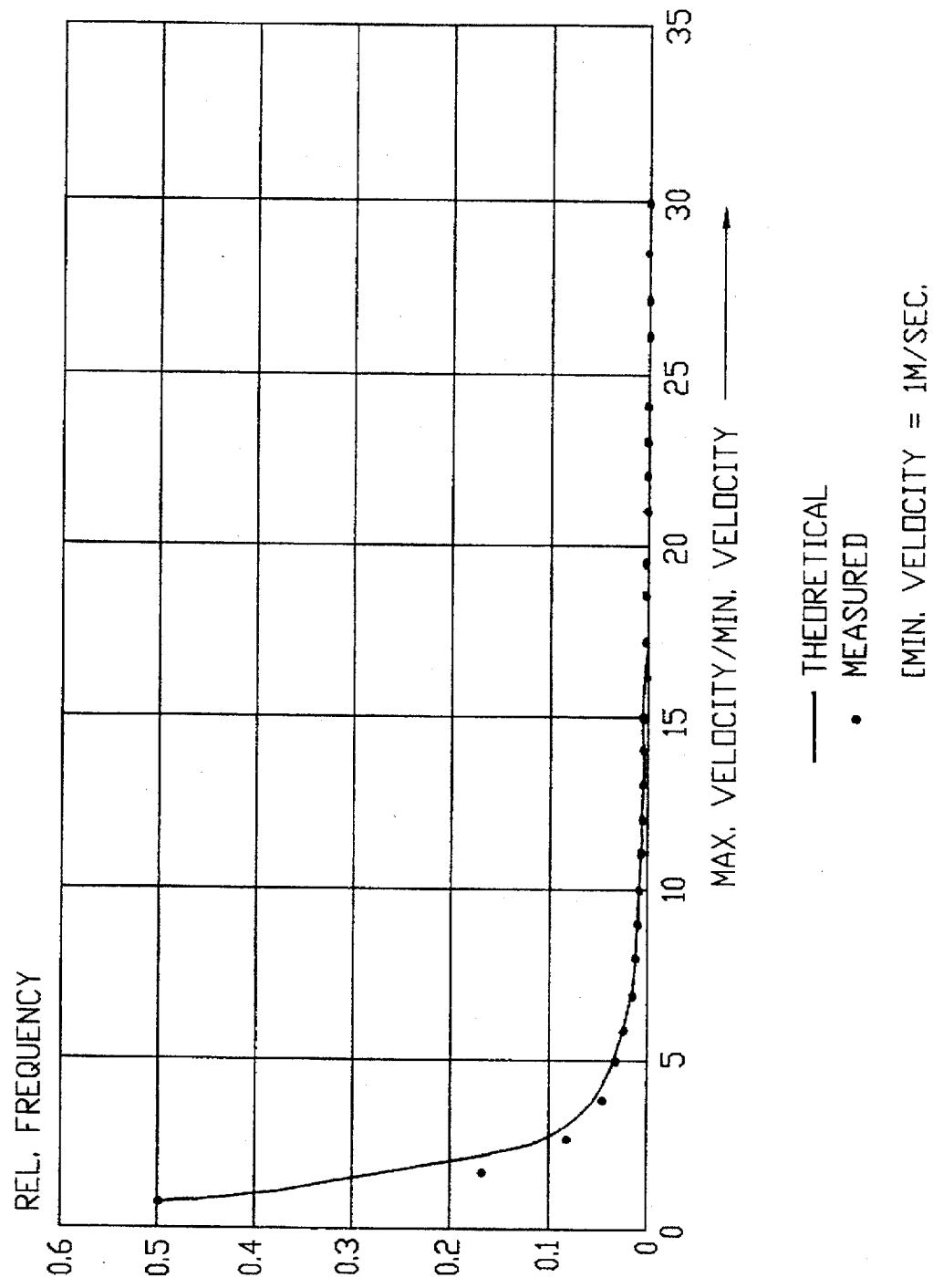
FIG. 10 shows the relative frequency of occurrence as a function of the ratio of the maximum particle velocity to the minimum particle velocity, wherein the theoretical background velocity distribution substantially coincides with the experimental velocity distribution.
Figure 11:
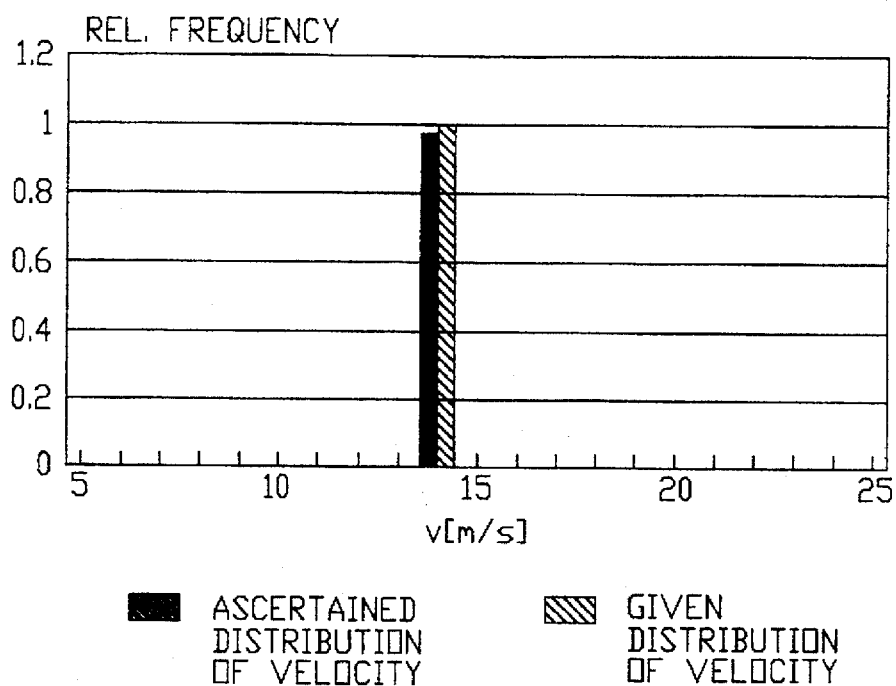
FIGS. 11 to 18 are bar graphs that compare a theoretical or given velocity distribution with an actually calculated velocity distribution with different particle velocity distribution as parameters.
Figure 12:
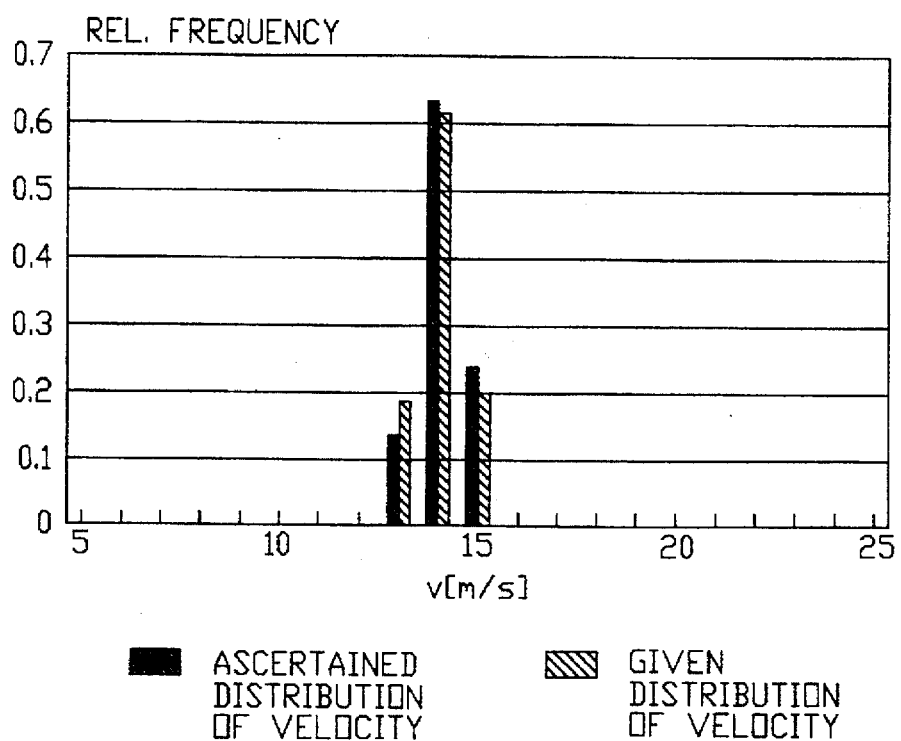
Figure 13:
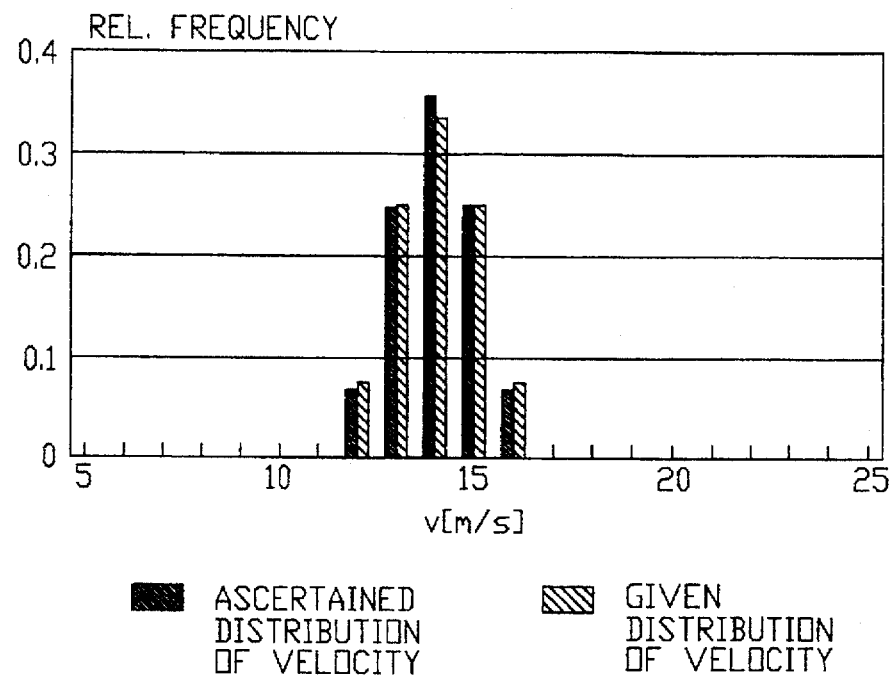
Figure 14:
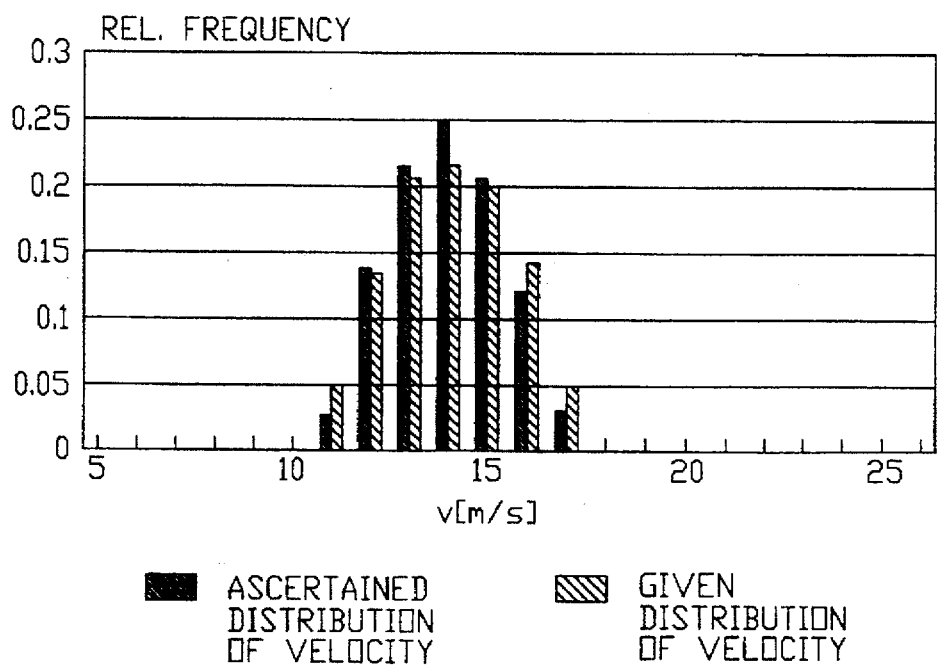
Figure 15:
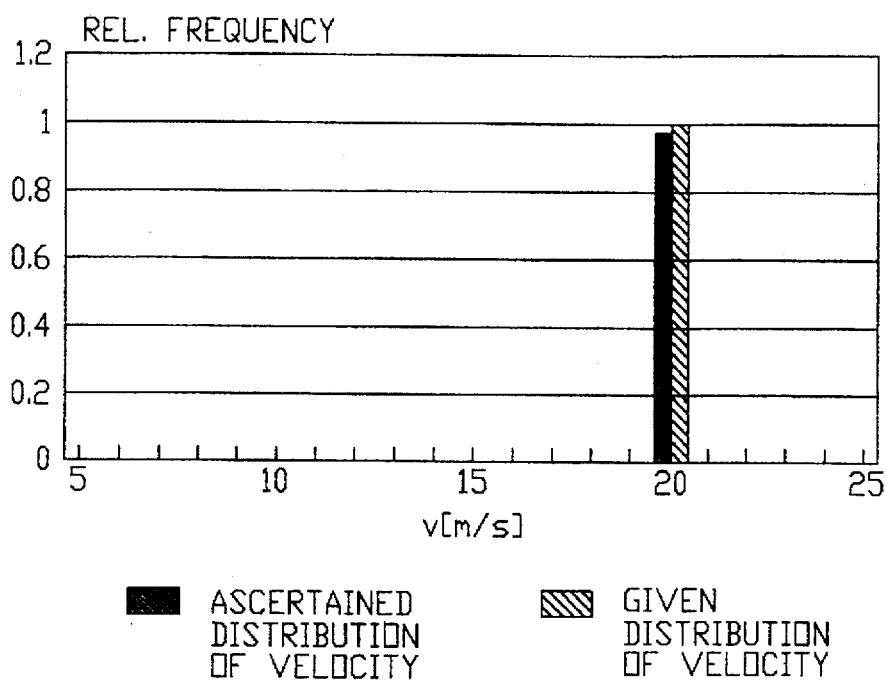
Figure 16:
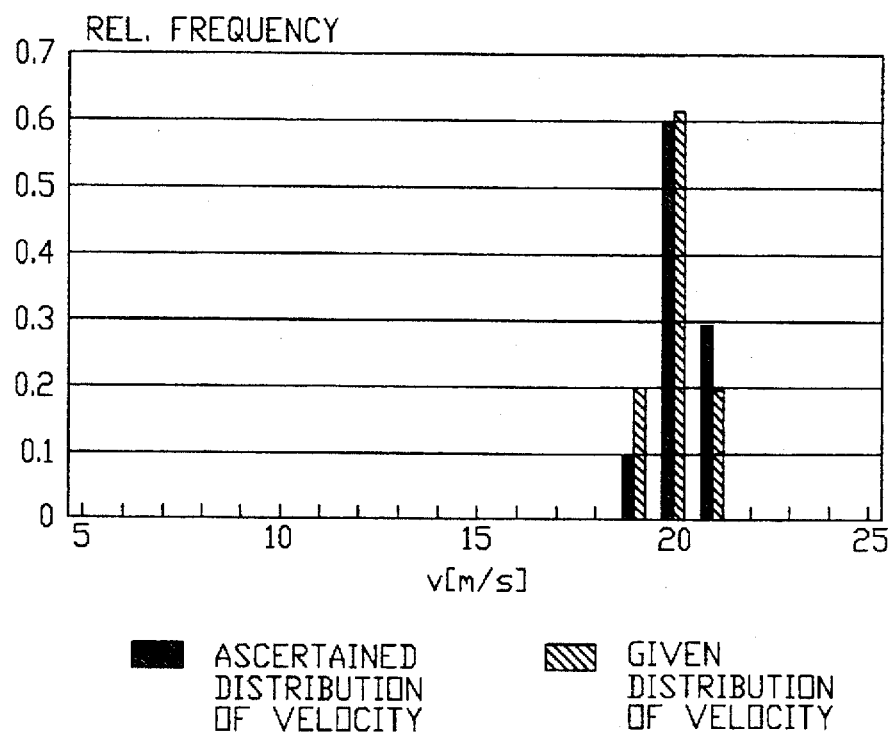
Figure 17:
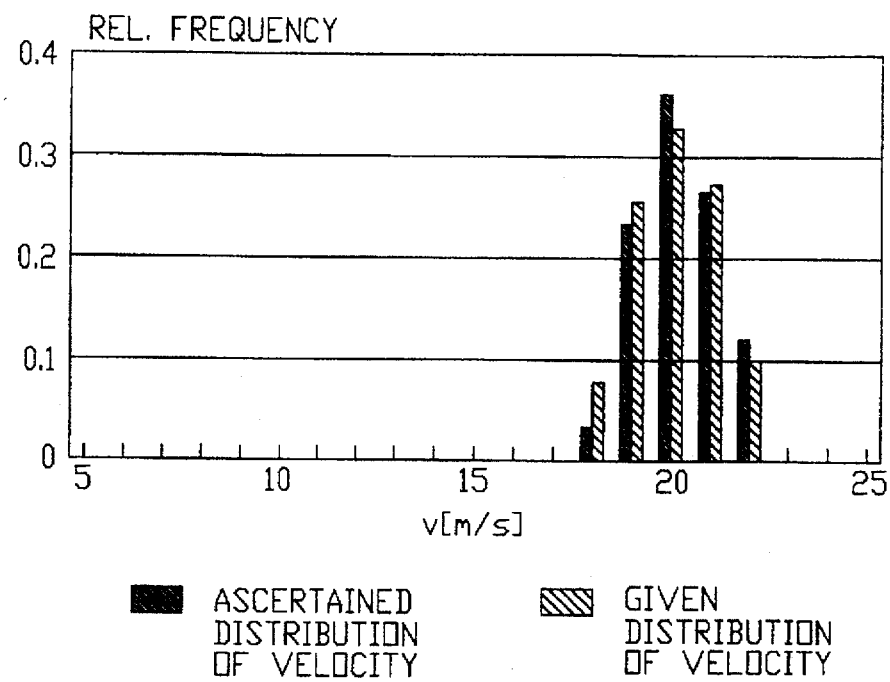
Figure 18:
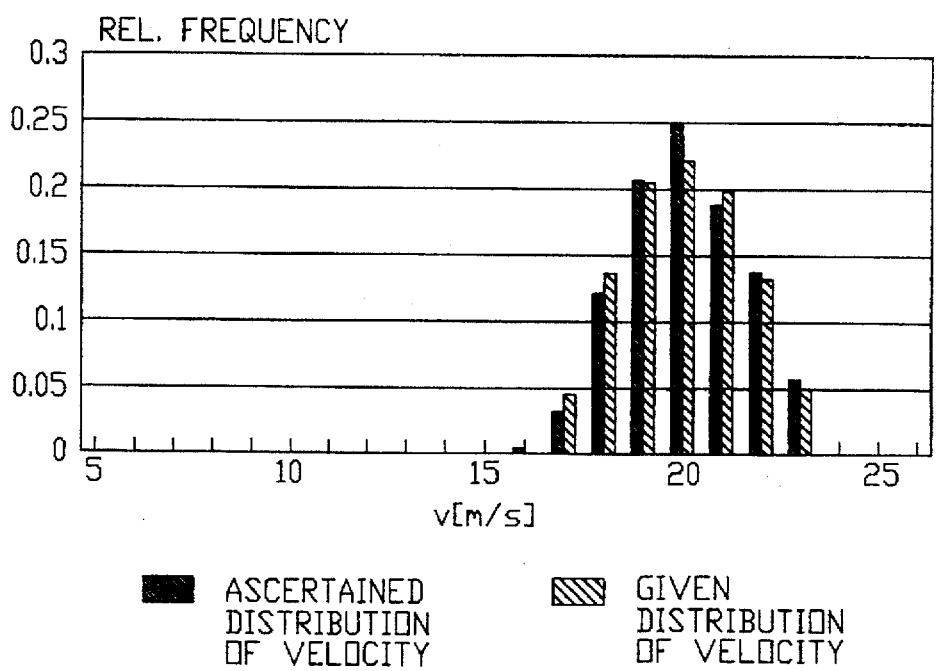

FIG. 10 shows the relative frequency on the ordinate and the ratio of the maximum velocity to the minimum velocity on the abscissa. The square dots represent measured points obtained in the experiment. The full line represents the theoretical velocity. There is a very substantial coincidence between the theoretical background distribution and the experimentally determined distribution. This good coincidence shows that the above mentioned probability distribution corresponds to the background velocity distribution.

The real or actual velocity distribution of the solid particles during a peening operation is now known. In order to check whether the on-line measuring method according to the invention in fact represents the actual velocity, it is possible to perform a simulation of signal sequences or pulse train in analogy to FIG. 8. This simulation is performed by allocating to each of the n-particles or spheres a velocity that is generated by a random function generator. Each of these spheres causes at a randomly selected point of time a signal at the first light barrier and subsequently a further signal at the second light barrier in accordance or corresponding to the velocity of the respective sphere or solid particle.

The velocity distributions generated by the random function generator are as follows:

a) velocity distribution with a fixed given velocity (δ-function)

$$p(v) = \begin{cases} 1: & v_k = v_0 \\ 0: & v_k \neq v_0 \end{cases} \qquad \text{Equation (9)}$$

wherein $v_0=15$ m/s in one instance and $v_0=20$ m/s in another instance.

b) Normal distribution (Gauss distribution)

$$p(v) = \frac{1}{\sqrt{2\Pi\sigma_v}} \exp\left(-\frac{1}{2} \frac{(v-v_0)^2}{\sigma_v^2}\right) \qquad \text{Equation (10)}$$

where $v_0=14$ m/s and $v_0=20$ m/s;
$\sigma_v=1$ m/s, 2 m/e, and 3 m/s;
$\sigma$=standard deviation.

FIGS. 11 to 18 show bar graphs comparing the given distributions with the measured distributions. A good coincidence between the respective individual distributions will be noted independently of the given mean velocity and independent of the type of the selected solid particle velocity distribution. Generally, it can be said that the solid particle velocity distributions determined according to the present measuring method have a smaller width or rather standard deviation compared to the given distributions. The maximal relative deviation from the given standard deviation $\sigma_v$ is in each instance smaller than 5 percent.

Figure 19:
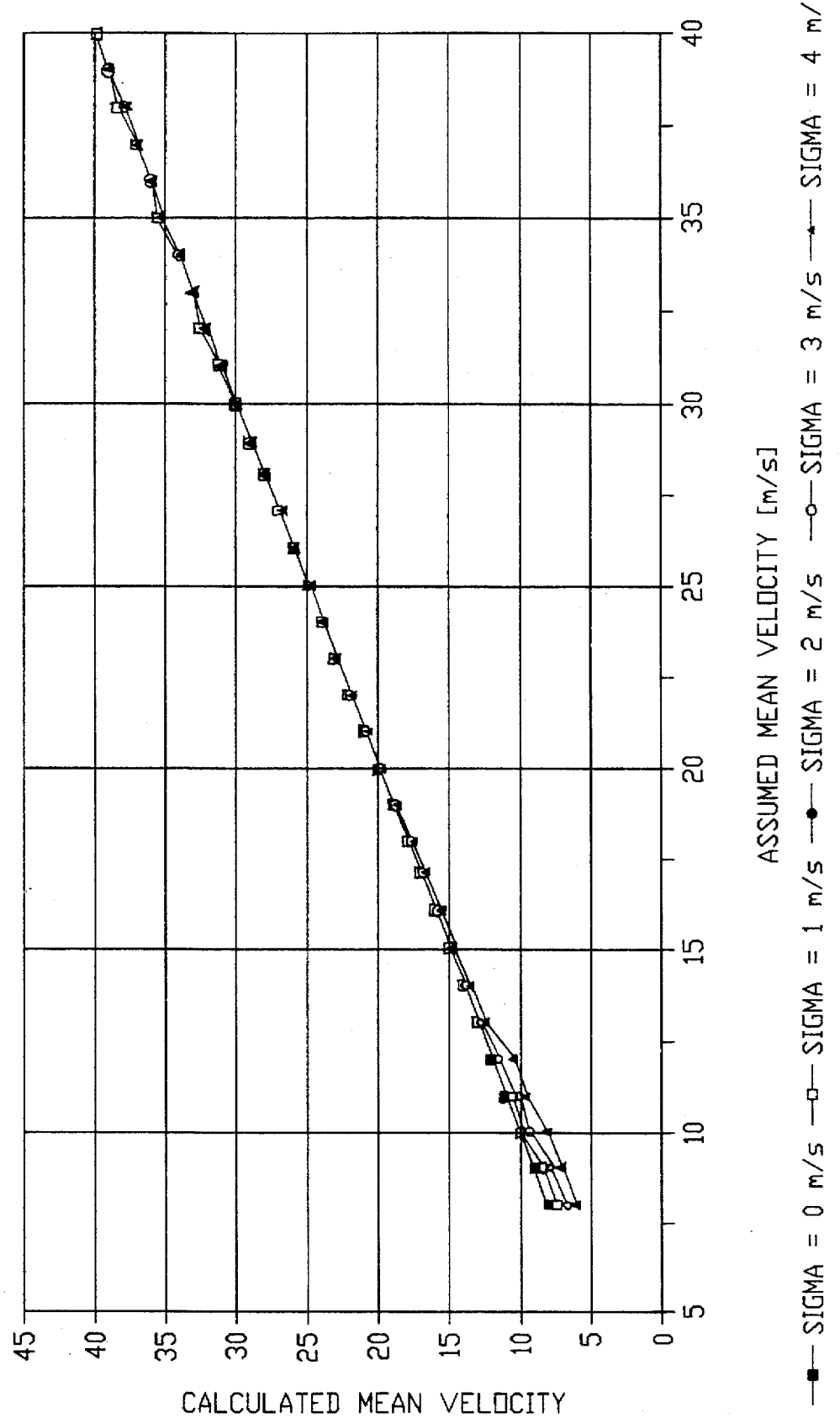
FIG. 19 shows the good coincidence between calculated and theoretical mean velocities with different standard deviations sigma.

Referring specifically to FIG. 19 it will be noted that the expected or anticipated velocity values ascertained according to the invention coincide very well with the given mean velocities. Since the simulated random velocity distributions and the real velocity distributions differ from one another very little, the results of the simulation show that the method according to the invention is suitable for determining the solid particle velocity during a deforming peening operation and such determination can be performed simply without any substantial calculation effort.

Figure 20:
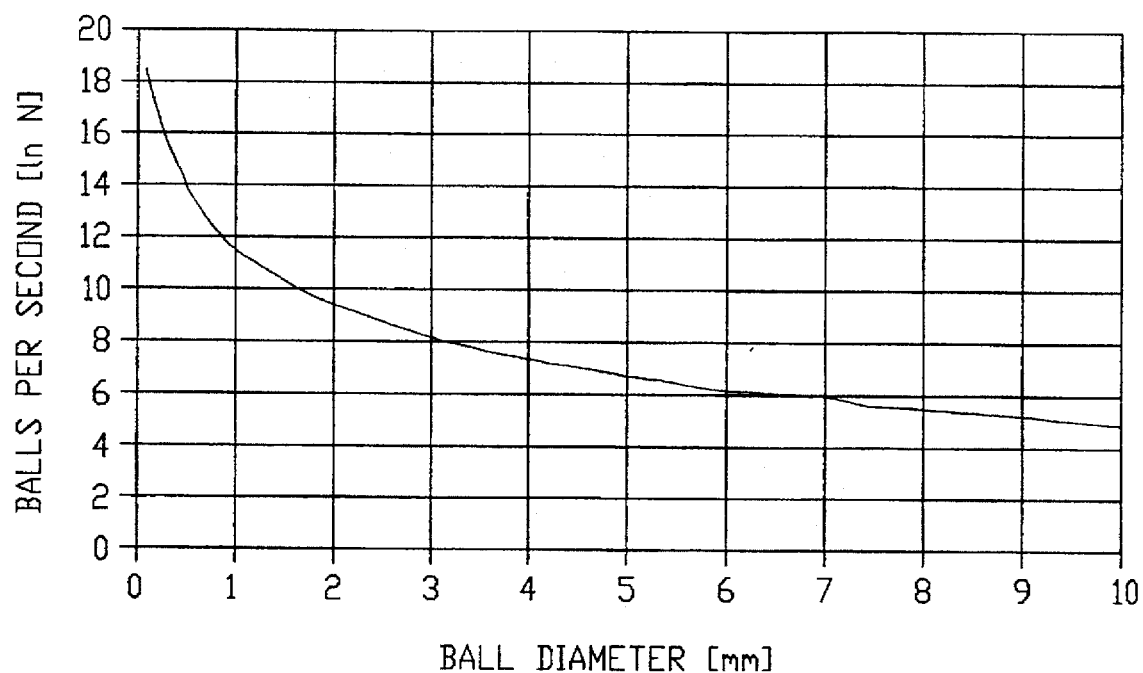
FIG. 20 shows the solid particle number per second on a natural logarithm scale as a function of the solid particle diameter in mm to illustrate that even for short measuring time intervals a statistically sufficient number of measurements are made.

The method according to the invention has been tested in connection with a seven axis computer numerical controlled peening apparatus. In such an apparatus it is possible to accelerate steel balls having a diameter in the range of 4 mm to 10 mm. The dosage of the steel balls or shot was in the range of 5 to 30 kg/min, when the spheres or balls had a diameter of 8 mm. The measuring interval ΔT as about 1 second. Under these conditions 100 to 1000 impulses were generated in the measuring interval. As the ball diameter decreased the number of the accelerated steel balls rapidly increased with the same dosing, whereby even for very small measuring intervals (ΔT<<1 s) a sufficiently large number of signals has been generated and thus a statistically reliable velocity measurement can be made as illustrated in FIG. 20.

For the velocity measurements it was assumed that the number of balls registered in a measuring interval ΔT is much larger than 1. If a velocity measurement is to be made for steel balls having a diameter within the range of 4 to 10 mm, it is necessary that substantially each individual ball must be registered at the measuring stations 5 and 6. In order to assure this condition, two measuring devices as shown in FIG. 1 are installed at the nozzle output of an injector gravitational peening system at each of these nozzle exits spaced with the spacing ds. The detectors of these measuring devices are linked through NAND-gates.

Although it was assumed that for the determination of the shot velocity the individual balls or solid particles travel in a motion parallel to the line that extends perpendicularly to the light barriers, the shot generally has a velocity component that extends perpendicularly to the assumed travel direction, namely in the direction of the light barriers. Depending on this component, the actual distance ds' travelled by the balls between the light barriers depends on this component. Accordingly, the experimentally determined velocity $v_2$ also depends on this component as shown in FIG. 21.

The resulting error depends on the spacing ds of the individual light barrier and from the ball or sphere diameter $d_k$ if one assumes that the light beam diameter is negligibly small. Under these assumptions the resulting error can then be expressed as follows.

$$\frac{v_2 - v_1}{v_1} = \frac{1}{1 \pm \frac{d_k}{2ds}} - 1 = \mp \frac{d_k}{2ds} \qquad \text{Equation (11)}$$

In this equation $v_2$ represents the experimentally ascertained velocity of the respective ball and $v_1$ represents the actual velocity of the ball such as a steel ball.

If, however, the light barriers have a finite diameter $d_{Ser}$ which is within the order of magnitude of the diameter of the steel ball and if additionally the intensity of the light beam is so large that the detectors (8) and (11) will generate a signal only when the light beam is completely interrupted by the ball, then the velocity measurement can be made with a larger accuracy based on the following equation:

$$\frac{v_2 - v_1}{v_1} \approx \frac{1}{\pm \frac{d_k - d_{str}}{2ds}} - 1 \approx \mp \frac{d_k - d_{str}}{2ds} \qquad \text{Equation (12)}$$

Thus, by a proper selection of the light beam diameter as a function of the diameter of the steel balls employed, it is possible in the present method to minimize the occurring error.

FIG. 22 shows the shot velocity as a function of the gas carrier pressure that maintains the shot flow at various flow densities as parameters. Six mass flow densities are shown in five kg/min increments for adding the peening shot into the carrier flow. At the higher carrier pressures the velocities converge except for a mass flow of 5 kg/min.

Although the invention has been described with reference to specific example embodiments, it will be appreciated that it is intended to cover all modifications and equivalents within the scope of the appended claims.

What is claimed is:

1. A method for determining a real particle velocity distribution of solid particles travelling in a gas carrier flow through a blow channel (2) forming a flow passage in a mechanical peening operation, comprising the following steps:

(a) blowing said gas carrier flow (3) with said solid particles dispersed in said gas carrier flow through said flow passage so that said solid particles travel substantially in the same flow direction independently of one another through said flow passage, (b) exposing at least a partial stream of said travelling solid particles to a first light beam (9) passing through said flow passage at a first light detecting position in said flow passage, (c) detecting light influenced by said solid particles at said first light detection position to produce first electrical signals, (d) storing said first electrical signals in a memory of a central processing unit, (e) exposing said at least partial stream of said travelling solid particles to a second light beam (12) at a second light detection position spaced at a defined distance (s) downstream of said first light detection position as viewed in said flow direction, (f) detecting light influenced by said solid particles at said second light detection position to produce second electrical signals, (g) storing said second electrical signals in said memory, (h) measuring time differences between any one signal of said first electrical signals and a multitude of said second electrical signals, (i) repeatedly calculating, on the basis of said time differences and said defined distance (s), a multitude of velocities to form a sum velocity distribution, and (j) deducting from said sum velocity distribution a known random background velocity distribution to obtain said real particle velocity distribution.

2. The method of claim 1, wherein said first and second light beams have a cross-sectional configuration depending on a cross-sectional configuration of said solid particles.

3. The method of claim 2, wherein said solid particles comprise peening shot having a shot diameter, and wherein said light beams have a beam diameter corresponding approximately to said shot diameter.

4. The method of claim 1, wherein said first and second light beams have such a light intensity that light detectors produce said first and second electrical signals when the respective light beam is completely covered by a particle passing through said respective light beam, whereby a light barrier formed by said respective light beam is interrupted.

5. The method of claim 1, further comprising providing said real particle velocity as a control signal and controlling a particle rate supply into said gas carrier flow with said control signal.

6. The method of claim 1, further comprising providing said real particle velocity as a control signal and controlling said gas carrier flow with said control signal.

7. An apparatus for determining a real particle velocity distribution of solid particles travelling in a gas carrier flow in a mechanical peening operation, comprising a blow channel (2) forming an enclosed flow passage for said solid particles, first light transparent openings (2A, 2B) in said blow channel (2), a first light source (7) positioned for passing a first light beam (9) through said flow passage and through said first light transparent openings substantially perpendicularly to a travel direction of said solid particles, second light transparent openings (2C, 2D) in said blow channel (2) downstream of said first light transparent openings (2A, 2B) as viewed in said travel direction of said solid particles, a second light source (10) for passing a second light beam (12) through said flow passage substantially perpendicularly to said travel direction and through said second light transparent openings (2C, 2D), a fixed spacing (s) between said first and second light beams (9 and 12), first and second optical detectors (8, 11) positioned at said first and second light transparent openings respectively for detecting light and producing respective first and second electrical signals (8A, 11A), first and second amplifiers (8B, 11B) connected to said first and second optical detectors respectively, and a computer connected to said first and second amplifiers for calculating said real particle velocity distribution by forming a sum velocity distribution from a multitude of velocities calculated by said computer on the basis of time differences between said first and second signals and said fixed spacing (s), and by then deducting from said sum velocity distribution a known random background velocity distribution to obtain said real particle velocity distribution.

8. The apparatus of claim 7, wherein said first light source (7) and said first optical detector (8) are positioned diametrically opposite each other on opposite sides of said blow channel (2) so that said first light beam passes at a right angle to said travel direction through said blow channel (2) at said first light transparent openings (2A, 2B), and wherein said second light source (10) and said second optical detector (11) are also positioned diametrically opposite each other on opposite sides of said blow channel (2) at said second light transparent openings (2C, 2D) spaced from said first openings by said fixed spacing (s) so that said second light beam also passes at a right angle to said travel direction through said blow channel (2).

9. The apparatus of claim 7, wherein said first light transparent openings (2A, 2B) are located vertically above said second light transparent openings (2C, 2D), and wherein said fixed spacing (s) extends vertically.

10. The apparatus of claim 1, wherein said blow channel (2) comprises a tubular member with transparent wall sections at said first and second openings (2A, 2B, 2C, 2D), and wherein said first and second light sources (7, 10) and said first and second detectors (8, 11) are positioned outside said tubular member at said transparent wall sections.

* * * * *

UNITED STATES PATENT AND TRADEMARK OFFICE
CERTIFICATE OF CORRECTION

PATENT NO. : 5,691,483

DATED : Nov. 25, 1997

INVENTOR(S) : Linnemann

It is certified that error appears in the above-identified patent and that said Letters Patent is hereby corrected as shown below:

Col. 3, line 37, replace "bution" by --butions--.

Col. 5, line 63, replace "V" by --v--.

Col. 7, line 25, replace the line to read:

$$--p(v) = \frac{1}{\sqrt{2\pi}\sigma_v} \exp\left(-\frac{1}{2}\frac{(v-v_0)^2}{\sigma_v^2}\right) \qquad \text{Equation (10)}--.$$

line 31, replace "2 m/e," by --2 m/s,--;
line 32, replace "σ = standard" by --$\sigma_v$ = standard--.

Col. 8. line 35, replace "$d_{Ser}$" by --$d_{Str}$--;
line 43, replace the line to read:

$$--\frac{v_2 - v_1}{v_1} = \frac{1}{1 \pm \frac{d_k - d_{Str}}{2ds}} - 1 = \mp \frac{d_k - d_{Str}}{2ds} \qquad \text{Equation (12)}--.$$

Signed and Sealed this

Twenty-first Day of April, 1998

*Attest:*

BRUCE LEHMAN

*Attesting Officer*   *Commissioner of Patents and Trademarks*